United States Patent [19]
Park et al.

[11] Patent Number: 5,684,547
[45] Date of Patent: Nov. 4, 1997

[54] LIQUID CRYSTAL DISPLAY PANEL AND METHOD FOR FABRICATING THE SAME

[75] Inventors: Woon-Yong Park; Dong-Gyu Kim, both of Suwon; Won-Hee Lee, Seoul, all of Rep. of Korea

[73] Assignee: Samsung Electronics Co., Ltd., Suwon, Rep. of Korea

[21] Appl. No.: 522,158

[22] Filed: Aug. 3, 1995

[30]       Foreign Application Priority Data

Aug. 5, 1994  [KR]  Rep. of Korea ............... 94-19378
Jul. 24, 1995 [KR]  Rep. of Korea ............... 95-21917

[51] Int. Cl.⁶ ............................................ G02F 1/1333
[52] U.S. Cl. ............................................ 349/54
[58] Field of Search .......................... 359/59, 54, 87; 349/42, 40, 46, 54, 192

[56]          References Cited

U.S. PATENT DOCUMENTS 4,688,896  8/1987  Castleberry ................... 359/54
4,807,973  2/1989  Kawasaki ...................... 350/332
4,840,459  6/1989  Strong .......................... 359/54
5,532,853  7/1996  Song et al. ..................... 359/87

FOREIGN PATENT DOCUMENTS 59-9634  1/1984  Germany ....................... 359/54

*Primary Examiner*—William L. Sikes
*Assistant Examiner*—James A. Dudek
*Attorney, Agent, or Firm*—Cushman Darby & Cushman, IP Group of Pillsbury Madison & Sutro LLP

[57]              ABSTRACT

The present invention is directed to a method for fabricating a liquid crystal display panel in which a repair line is formed of a gate line metal and a data line metal to facilitate the repair process of any broken gate line. Any disconnected data lines can be repaired. Repairing the disconnected data lines involves their short-circuit, using a laser beam, with the repair lines vertically formed underneath the data lines. That is one repair line, which is adjacent to the connection part of the repair lines, and the data lines are short-circuited. Thus, the disconnected data line can be repaired through the repair lines and the auxiliary repair lines with ease, thus providing a simple repair process.

10 Claims, 9 Drawing Sheets

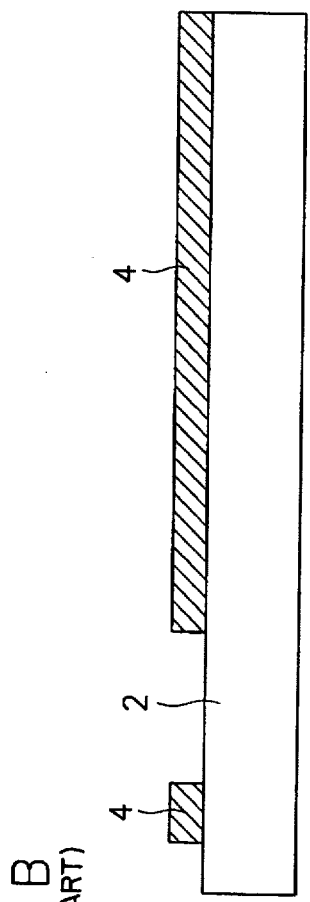
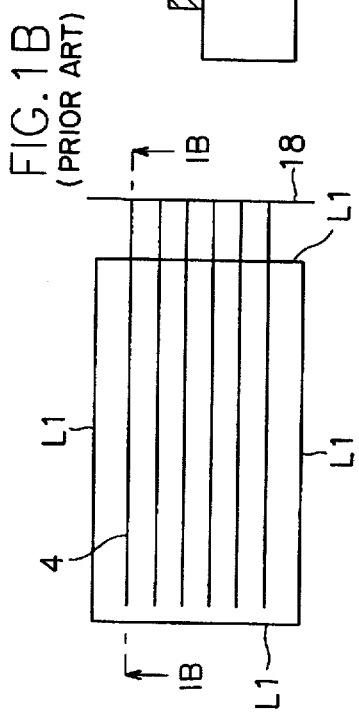
FIG. 1A (PRIOR ART)
FIG. 1B (PRIOR ART)
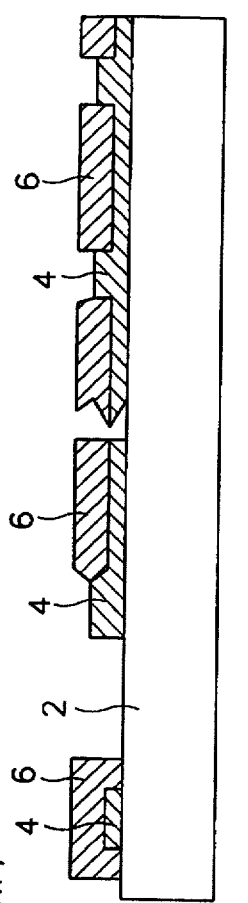
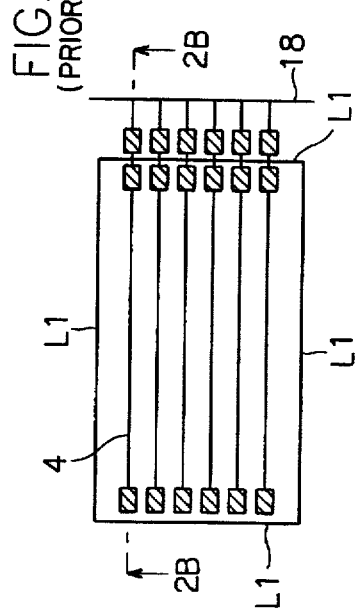
FIG. 2A (PRIOR ART)
FIG. 2B (PRIOR ART)
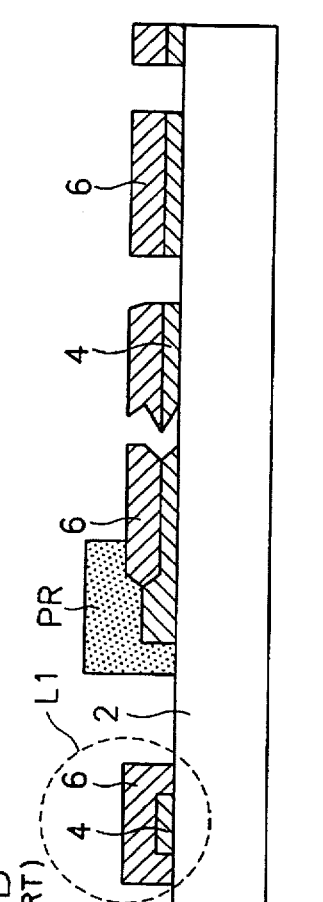
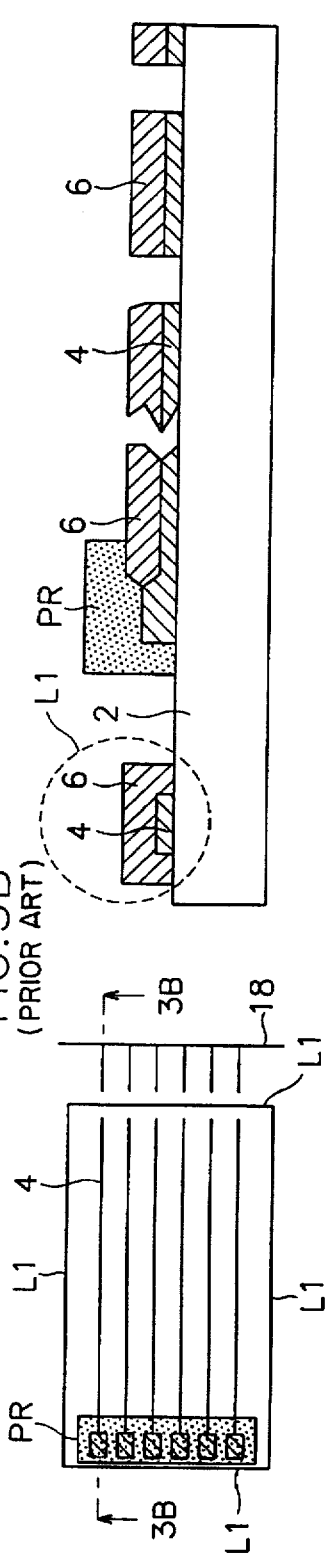
FIG. 3A (PRIOR ART)
FIG. 3B (PRIOR ART)

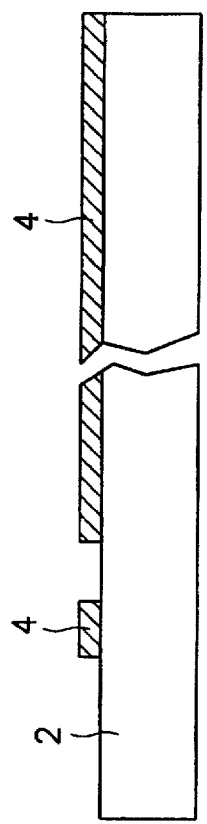
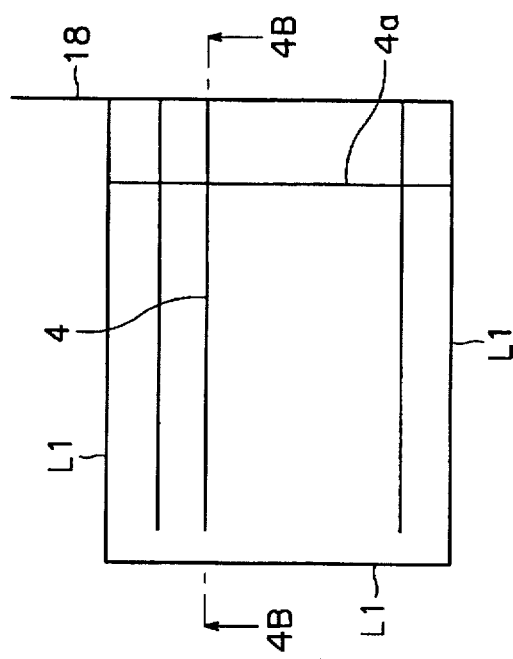
FIG.4B
FIG.4A
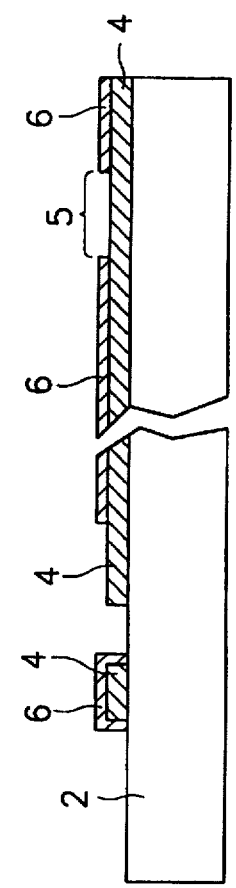
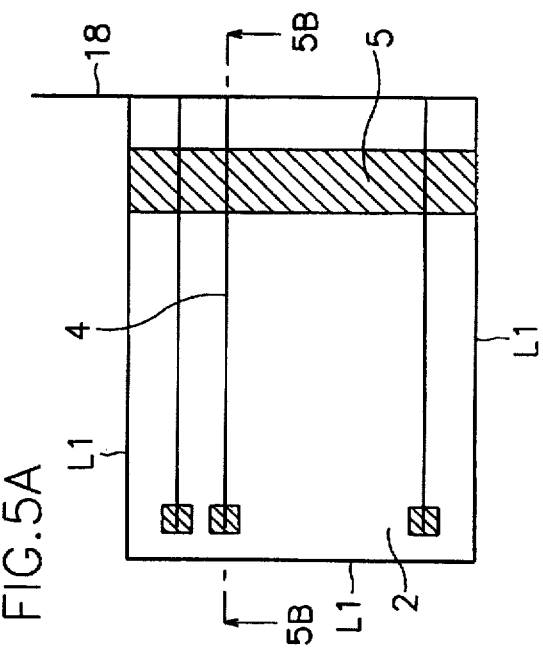
FIG.5B
FIG.5A

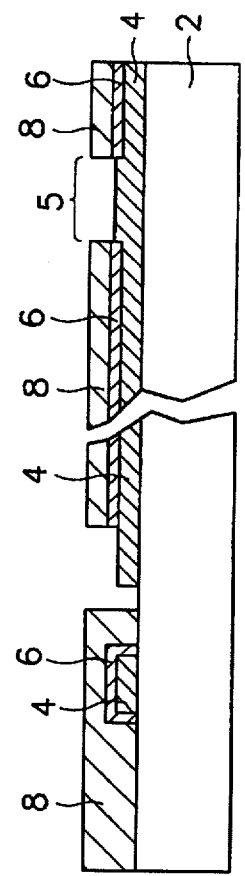
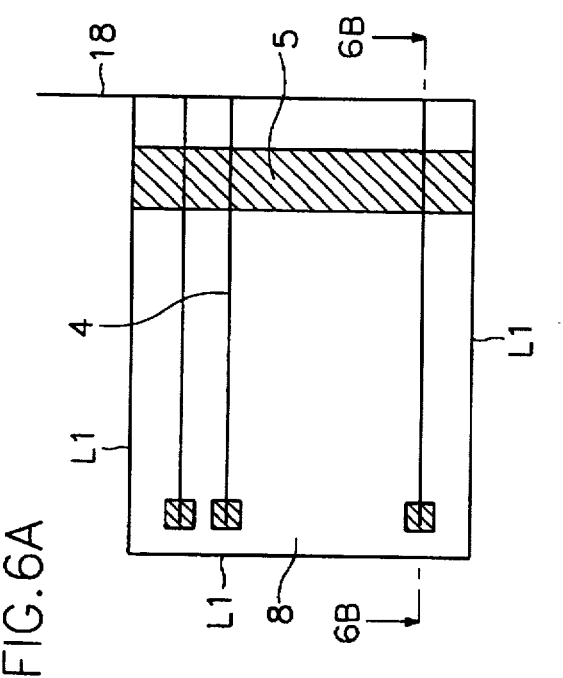
FIG.6A
FIG.6B
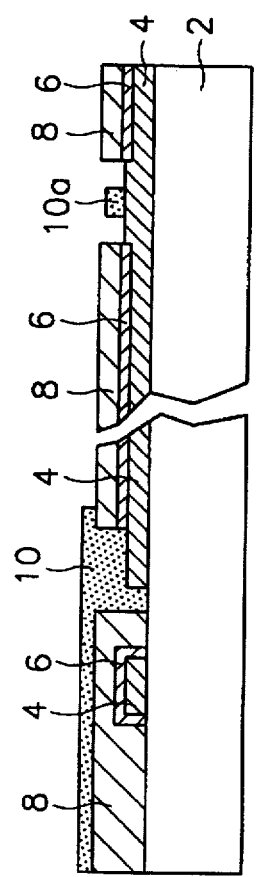
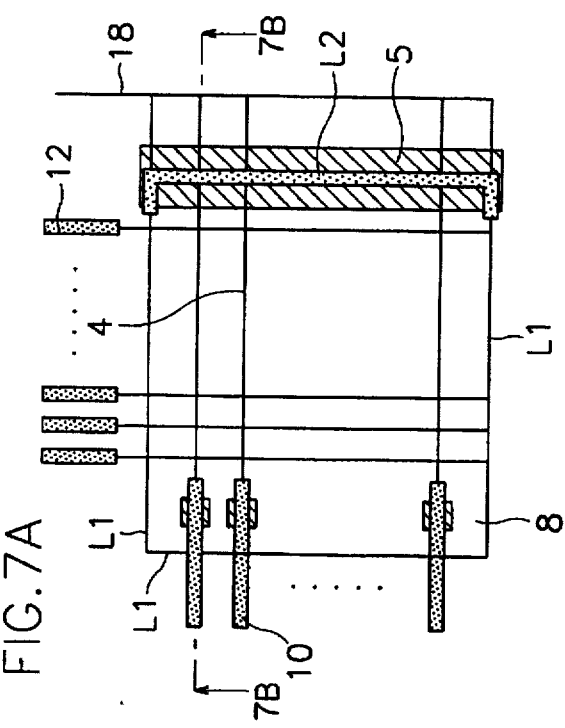
FIG.7A
FIG.7B

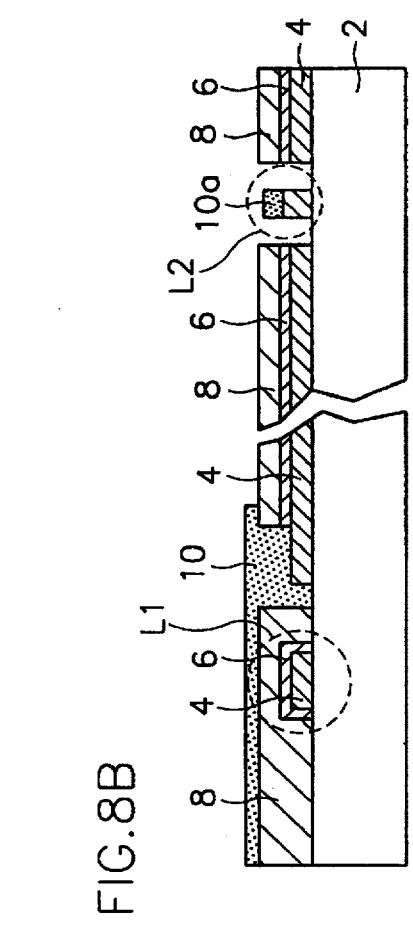
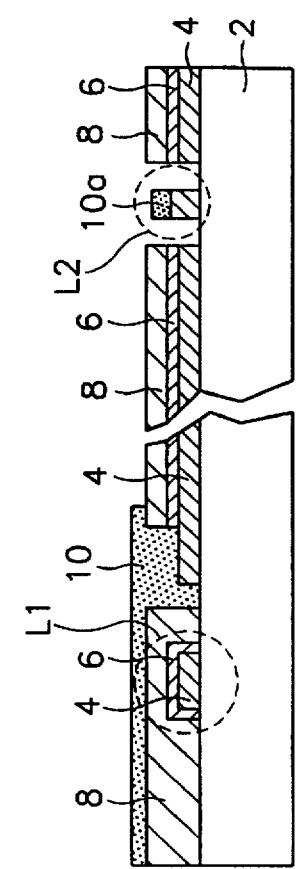
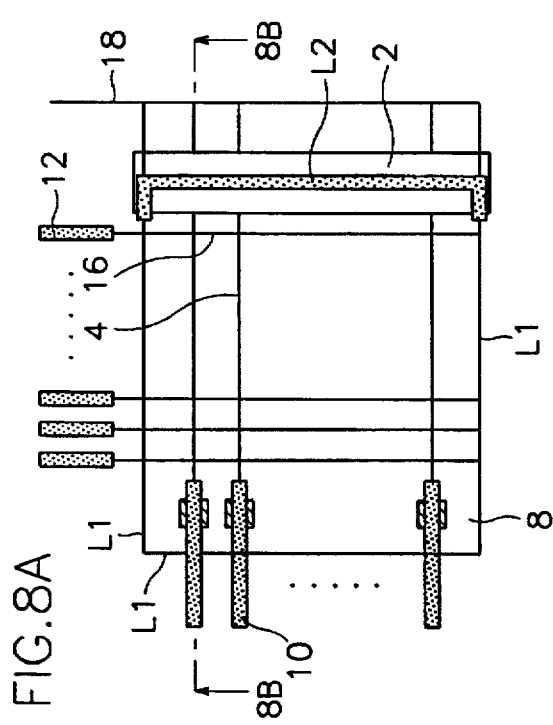
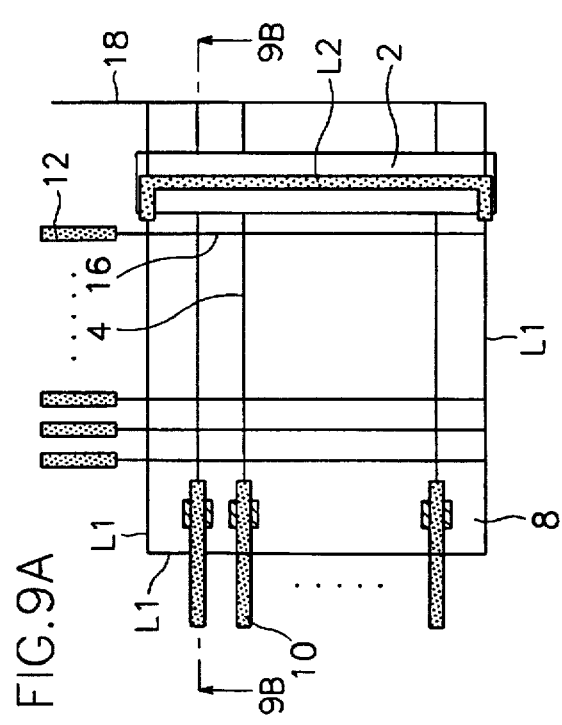

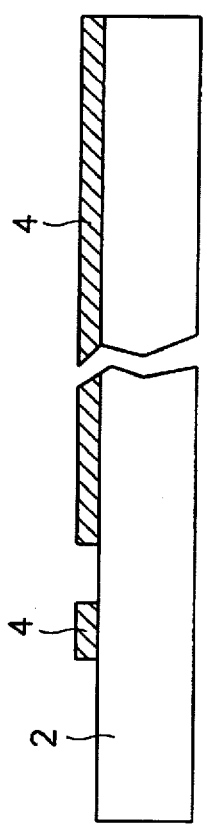
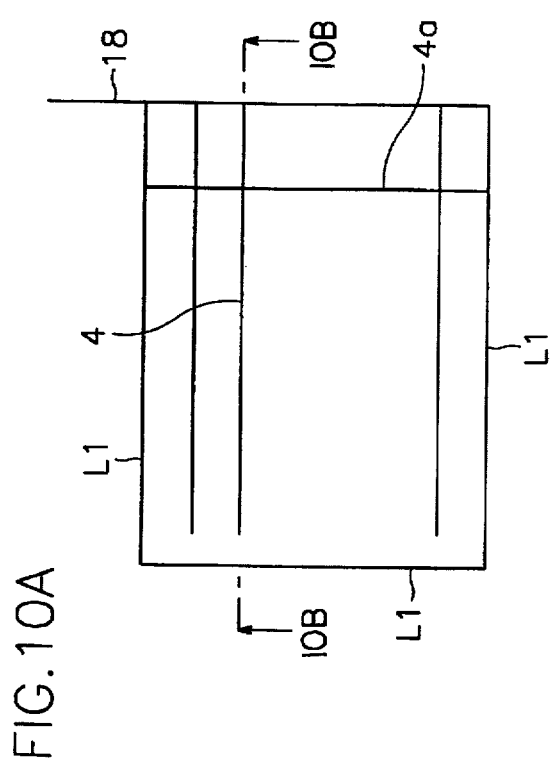
FIG.10A
FIG.10B
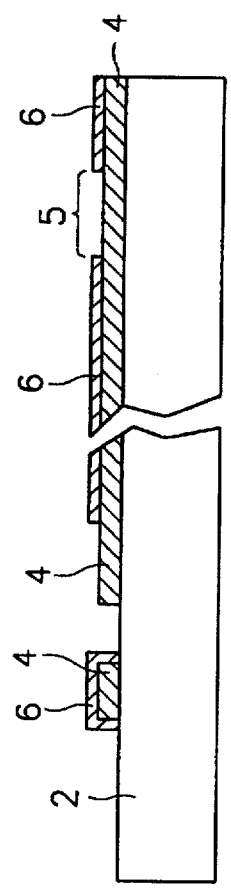
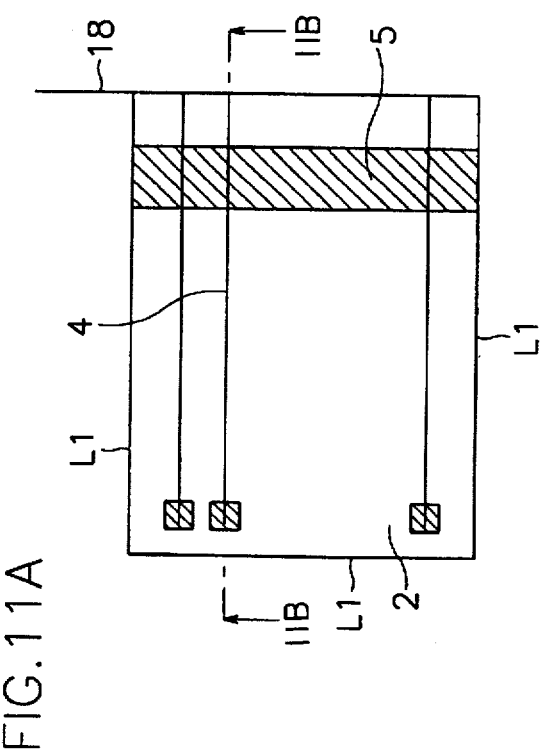
FIG.11A
FIG.11B

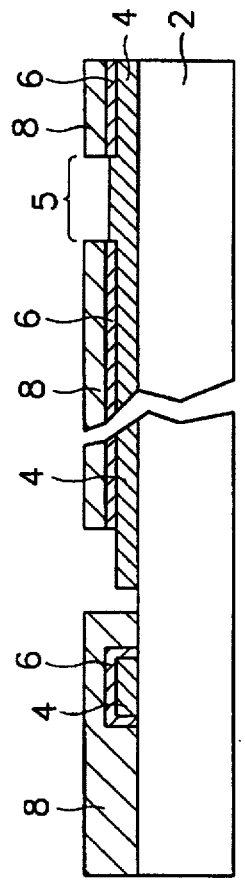
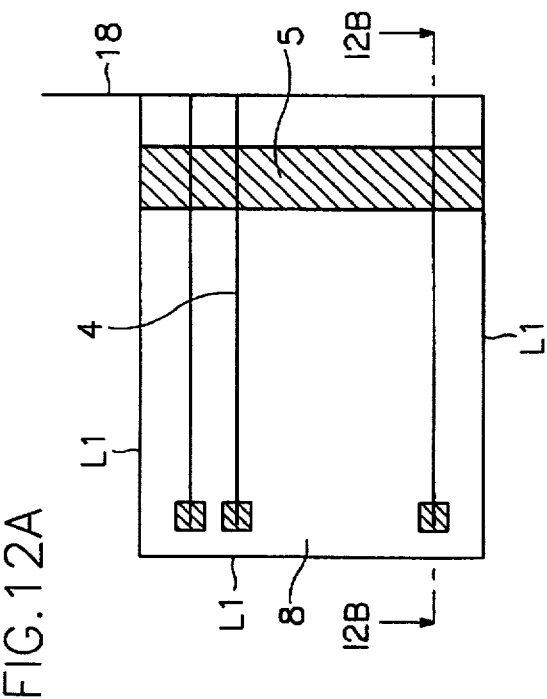
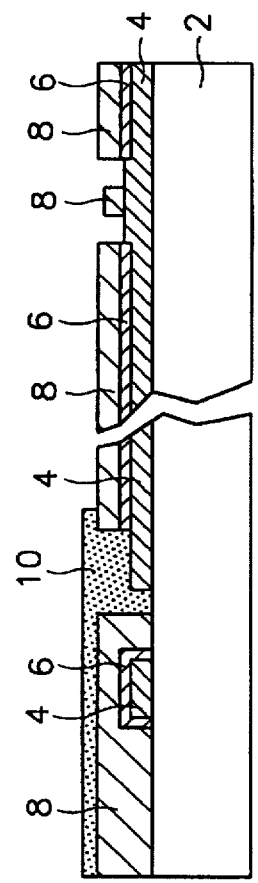
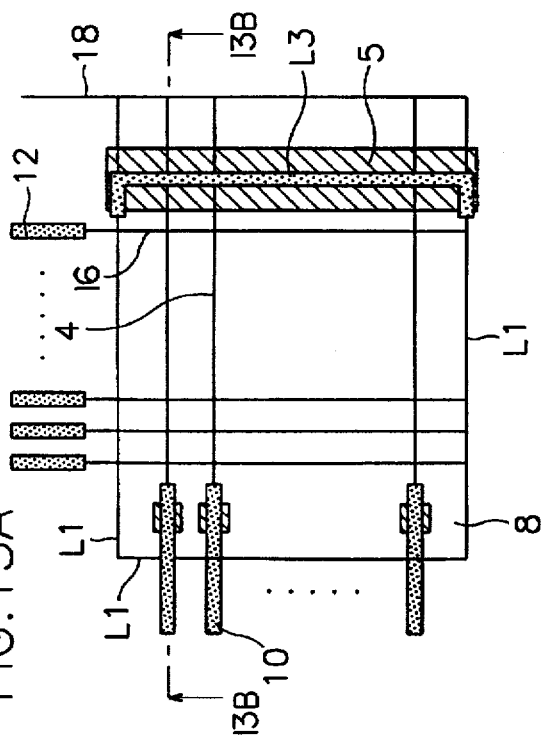

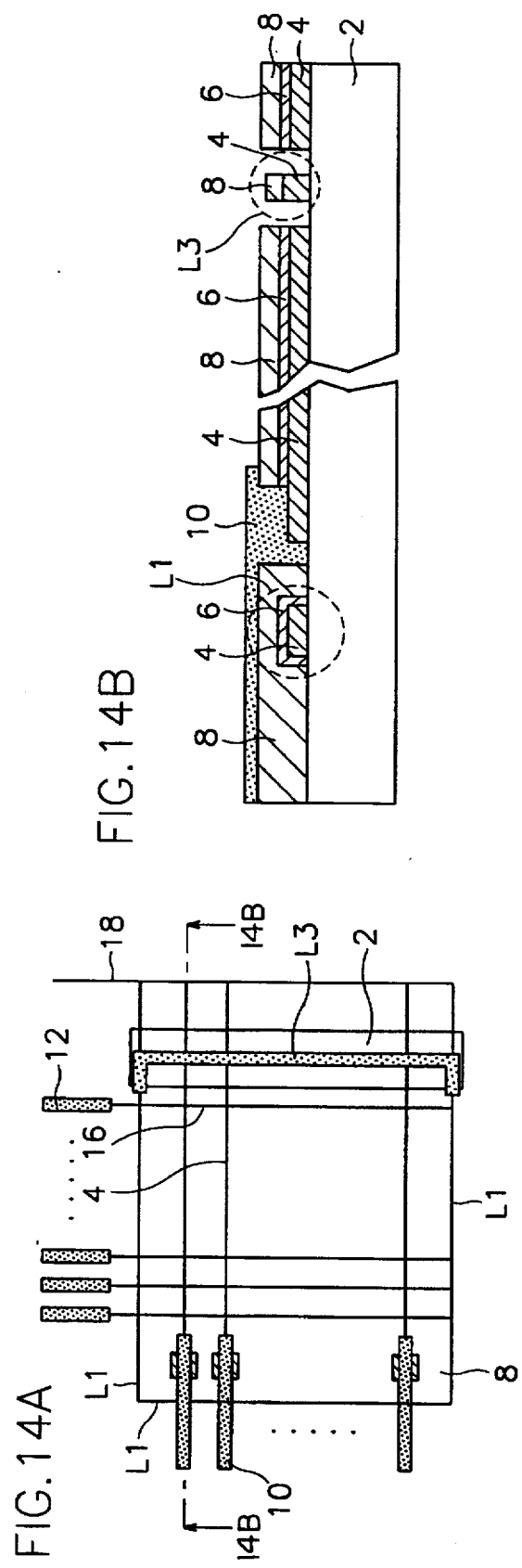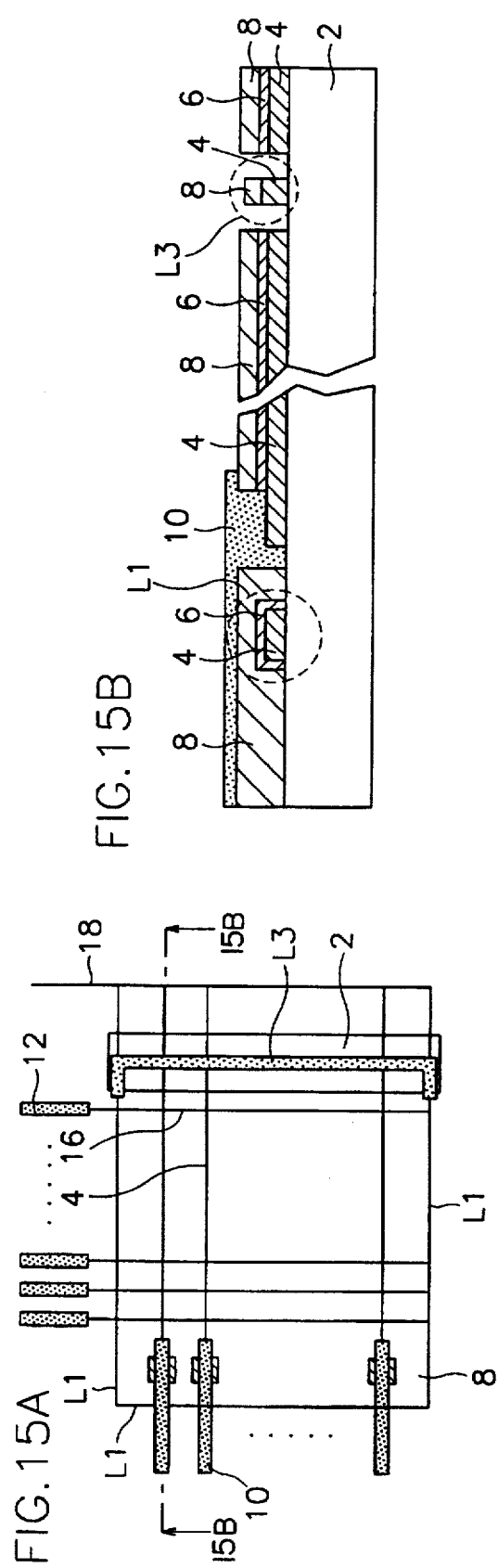

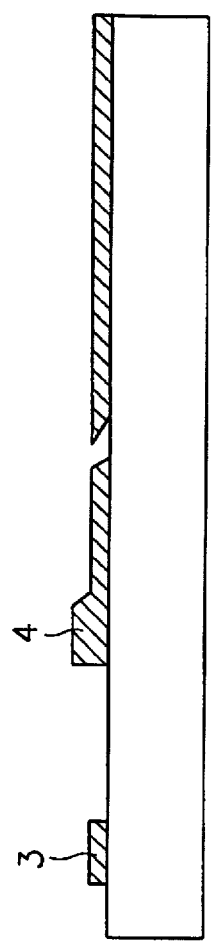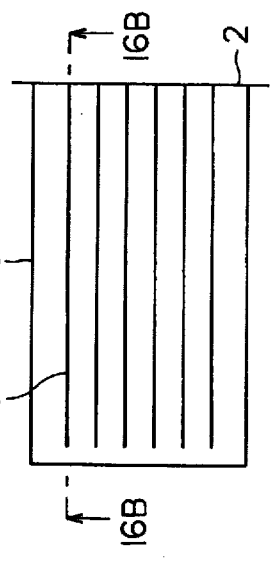
FIG.16A  FIG.16B
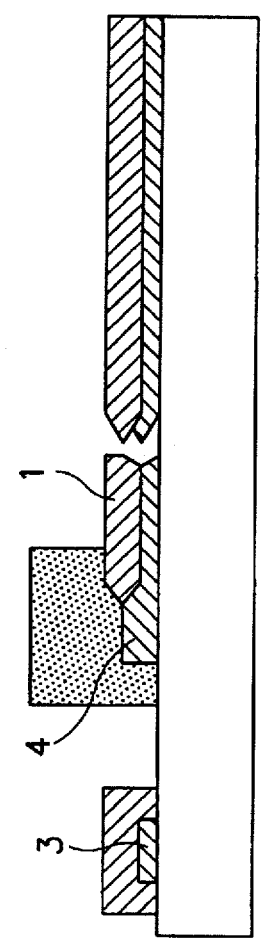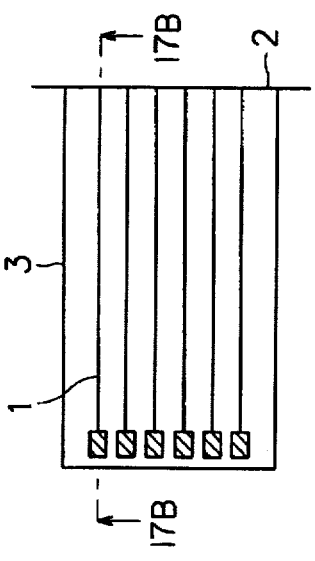
FIG.17A  FIG.17B
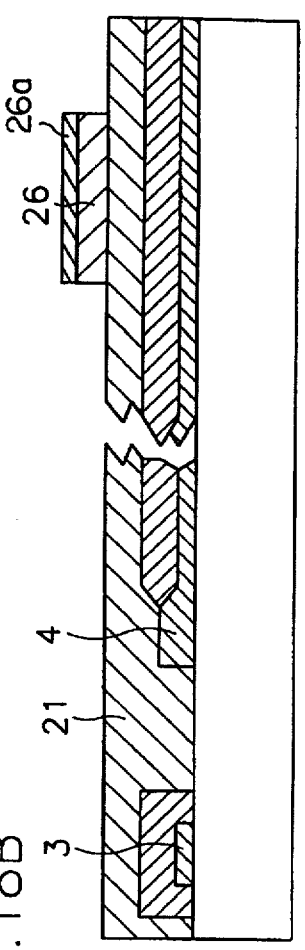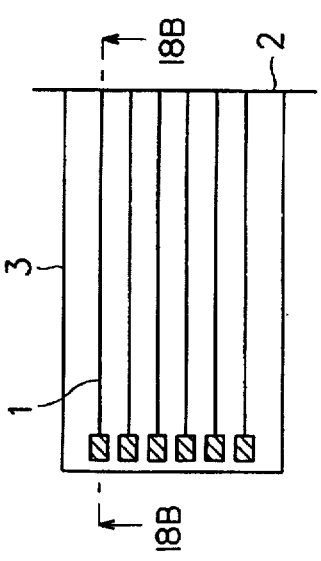
FIG.18A  FIG.18B

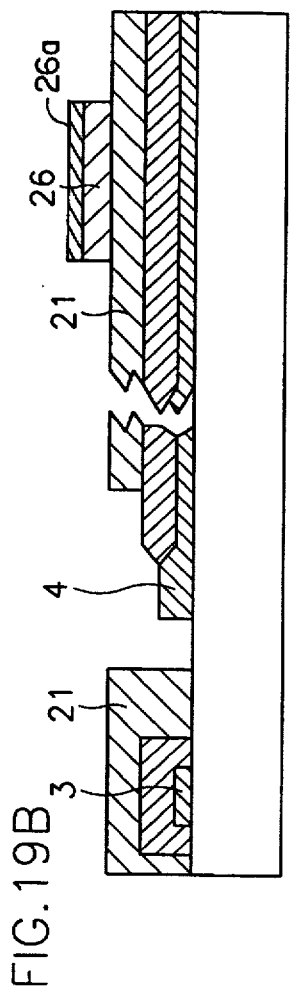
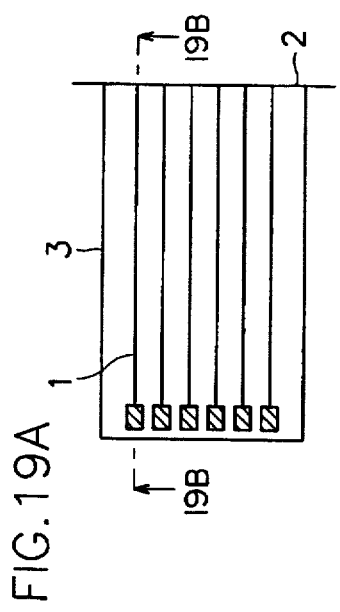
FIG.19A
FIG.19B
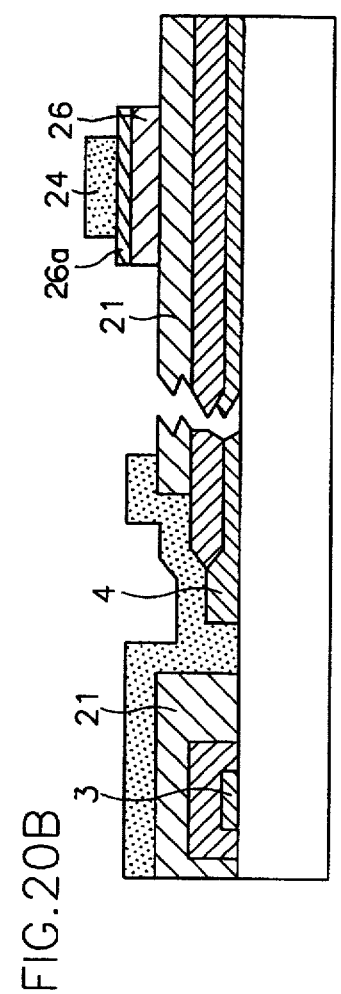
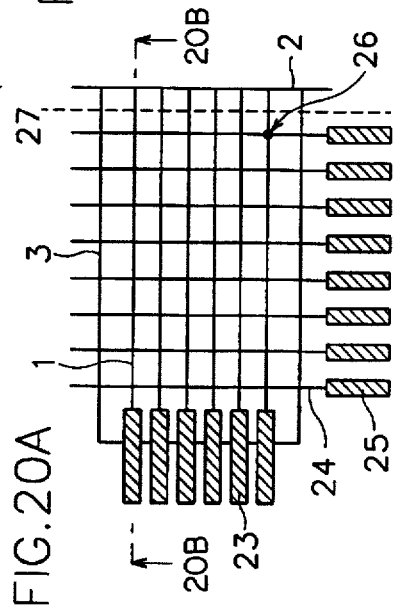
FIG.20A
FIG.20B
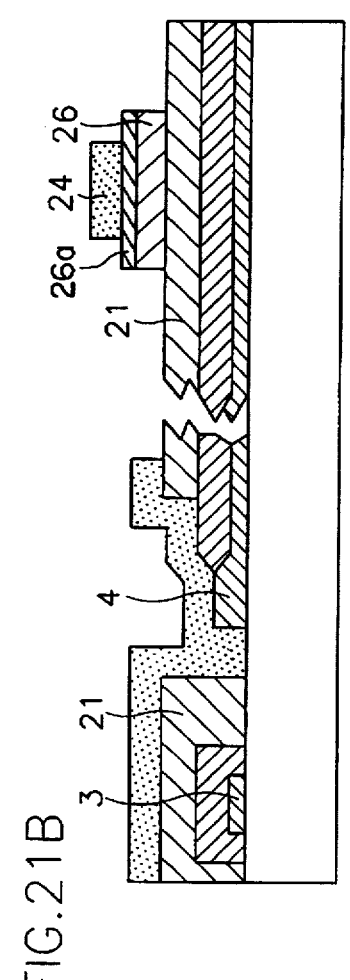
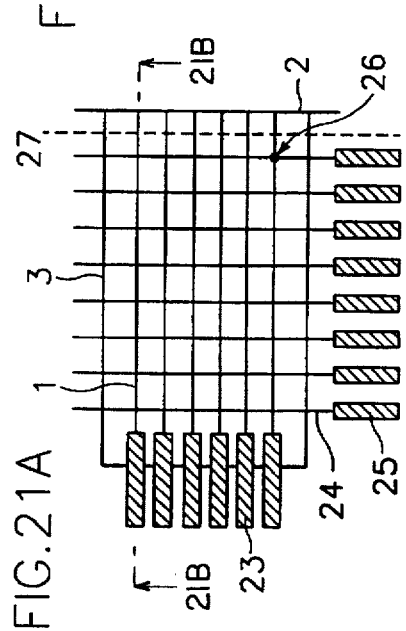
FIG.21A
FIG.21B

LIQUID CRYSTAL DISPLAY PANEL AND METHOD FOR FABRICATING THE SAME

BACKGROUND OF THE INVENTION

The present invention relates in general to an improved means and method for providing a liquid crystal display panel in which a repair line is formed of a gate line metal and a data line metal to facilitate the repair process for any broken data line.

DESCRIPTION OF THE PRIOR ART

A typical LCD panel having a repair line is described below, with reference to the attached drawings.

FIG. 1A is a plan view showing the formation of a repair line of a prior art LCD panel and FIG. 1B is a cross-sectional view taken along the line A—A' of FIG. 1A.

FIG. 2A is a plan view showing the anodization of a prior art LCD panel and FIG. 2B is a cross-sectional view taken along the line A—A' of FIG. 2A.

FIG. 3A is a plan view showing the isolation of a gate line of a prior art LCD panel and FIG. 3B is a cross-sectional view taken along the line A—A' of FIG. 3A.

The process for fabricating a prior art LCD panel having a repair line begins with the formation of repair line L1 taking the shape of a square in forming gate lines 4 with metal as shown in FIGS. 1A and 1B.

Subsequently, anodized films 6 are formed by anodizing gate lines 4 selectively, as shown in FIGS. 2A and 2B, and then repair line L1 and gate lines 4 are selectively isolated through the photoresist (PR) process, as shown in FIGS. 3A and 3B.

However, a problem occurs in that an additional photo-etching process for isolating repair line L1 from gate lines 4 is required, after forming repair line L1 in the shape of a square. This leads to decreases in yield rate, hinders LCD panel fabrication, and increases fabrication costs.

Further, according to another typical LCD panel having a repair line disclosed in U.S. Pat. No. 4,807,973 issued on Feb. 28, 1989, it is possible to form the repair line with either a gate line metal or a data line metal having the shape of a loop without an anodized film.

However, such a panel also has disadvantages in that a resistance-capacitance (RC) delay time is prolonged, thus leading to poor image quality when the repair lines are formed of a metal constituent of the data line having a high resistance.

SUMMARY OF THE INVENTION

It is an object of the present invention to solve the above-mentioned conventional disadvantages.

Another object of the present invention is to provide an LCD panel in which repair lines are formed of a metal constituent of gate lines and data lines to repair any broken gate lines with ease.

Still another object of the present invention is to provide a method for achieving the above-mentioned objects simultaneously.

According to one aspect of the present invention, there is provided an LCD panel comprising a substrate; a gate line formed on the substrate horizontally; a repair line formed on the substrate taking the shape of a square of which one side is open; a data line formed on the substrate vertically; an auxiliary repair line formed on the substrate, having a two-layered structure wherein one layer is made of the same material as the gate line and the other layer is made of the same material as the data line, and wherein the auxiliary repair line is parallel to the data line and vertically crossed with the gate line, still electrically disconnected to the gate line while electrically connected to the repair line.

The method for fabricating such an LCD panel comprises a first step of forming gate lines, a repair line, a lower line of an auxiliary repair line and a shorting bar at the same time; a second step of partially anodizing the gate lines selectively; a third step of coating an insulating film throughout the substrate and patterning thereof; a fourth step of forming gate pads and data pads while simultaneously forming an upper line of an auxiliary repair line, followed by coating a conductive material on the insulating film and patterning thereof; and a fifth step of photoetching the partially anodized gate lines adjacent to the auxiliary repair line using the upper line of the auxiliary repair line as a masking layer so as to thoroughly isolate the gate lines from the auxiliary repair line.

According to another aspect of the present invention, there is provided an LCD panel comprising a substrate; a gate line formed on the substrate horizontally; a repair line formed on the substrate taking the shape of a square of which one side is open; a data line formed on the substrate vertically; an auxiliary repair line formed on the substrate, made of the same material as the gate line, parallel to the data line and vertically crossed with the gate line, electrically disconnected to the gate line while electrically connected to the repair line.

The method for fabricating such an LCD panel comprises a first step of forming gate lines, a repair line, a lower line of an auxiliary repair line and a shorting bar at the same time; a second step of partially anodizing the gate lines, selectively; a third step of forming an upper line of an auxiliary repair line by coating an insulating film over the substrate thoroughly and patterning thereof; a fourth step of forming a gate pad and a data pad by coating a conductive material over the panel and patterning thereof; and a fifth step of photoetching the partially anodized gate lines adjacent to the auxiliary repair line using the insulating film as a masking layer so as to thoroughly isolate the gate lines from the lower auxiliary repair line.

According to still another aspect of the present invention, there is provided an LCD panel comprising gate lines composed of a metal and an anodizing film coated thereon; a repair line taking the shape of a square of which one side is open; a shorting bar serving as an anodization common electrode to connect the gate lines and the repair line; a connection part connected to the gate lines; a gate insulating film; a gate pad; a data line a data pad.

The method for fabricating such an LCD panel is comprised of forming gate lines and a repair line, simultaneously, and connecting the gate lines and the repair line through an anodization common shorting bar; carrying out anodization, hiding a connection part in an anodization-breaking film; depositing the gate insulating film, the silicon film and the N-type silicon film, subsequently, and patterning the amorphous silicon layer; and patterning the gate pad, the data line and data pad, simultaneously, followed by depositing a metal having a larger resistivity than the common gate line.

BRIEF DESCRIPTION OF THE DRAWINGS

FIG. 1A is a plan view showing the formation of a repair line of a prior art LCD panel and FIG. 1B is a cross-sectional view taken along the line A—A' of FIG. 1A;

FIG. 2A is a plan view showing the anodization of a prior art LCD panel and FIG. 2B is a cross-sectional view taken along the line A—A' of FIG. 2A;

FIG. 3A is a plan view showing the isolation of gate line of a prior art LCD panel and FIG. 3B is a cross-sectional view taken along the line A—A' of FIG. 3A;

FIG. 4A is a plan view showing the formation of a gate line, a repair line and a shorting bar according to one embodiment of this LCD panel and FIG. 4B is a cross-sectional view taken along the line A—A' of FIG. 4A;

FIG. 5A is a plan view showing anodization step according to one embodiment of this LCD panel and FIG. 5B is a cross-sectional view taken along the line A—A' of FIG. 5A;

FIG. 6A is a plan view showing the patterning of the gate insulating film according to one embodiment of this LCD panel and FIG. 6B is a cross-sectional view taken along the line A—A' of FIG. 6A;

FIG. 7A is a plan view showing the formation of a gate pad and a data pad according to one embodiment of this LCD panel and FIG. 7B is a cross-sectional view taken along the line A—A' of FIG. 7A;

FIG. 8A is a plan view showing the isolation of a gate line from a repair line according to one embodiment of this LCD panel and FIG. 8B is a cross-sectional view taken along the line A—A' of FIG. 8A;

FIG. 9A is a plan view of one embodiment of this invention and FIG. 9B is a cross-sectional view taken along the line A—A' of FIG. 9A;

FIG. 10A is a plan view showing the formation of a gate line, a lower line of a repair line and a shorting bar according to another embodiment of this LCD panel and FIG. 10B is a cross-sectional view taken along the line A—A' of FIG. 10A;

FIG. 11A is a plan view showing the anodization step according to another embodiment of this LCD panel and FIG. 11B is a cross-sectional view taken along the line A—A' of FIG. 11A;

FIG. 12A is a plan view showing the patterning of the gate insulating film according to another embodiment of this LCD panel and FIG. 12B is a cross-sectional view taken along the line A—A' of FIG. 12A;

FIG. 13A is a plan view showing the formation of a gate pad and a data pad according to another embodiment of this LCD panel and FIG. 13B is a cross-sectional view taken along the line A—A' of FIG. 13A;

FIG. 14A is a plan view showing the isolation of a gate line from a repair line according to another embodiment of this LCD panel and FIG. 14B is a cross-sectional view taken along the line A—A' of FIG. 14A;

FIG. 15A is a plan view of another embodiment of this invention and FIG. 15B is a cross-sectional view taken along the line A—A' of FIG. 15A;

FIG. 16A is a plan view showing the formation of a repair line according to still another embodiment of this LCD panel and FIG. 16B is a cross-sectional view taken along the line A—A' of FIG. 16A;

FIG. 17A is a plan view showing the formation of a repair line according to still another embodiment of this LCD panel and FIG. 17B is a cross-sectional view taken along the line A—A' of FIG. 17A;

FIG. 18A is a plan view showing the formation of a repair line according to still another embodiment of this LCD panel and FIG. 18B is a cross-sectional view taken along the line A—A' of FIG. 18A;

FIG. 19A is a plan view showing the formation of a repair line according to still another embodiment of this LCD panel and FIG. 19B is a cross-sectional view taken along the line A—A' of FIG. 19A;

FIG. 20A is a plan view showing the formation of a repair line according to still another embodiment of this LCD panel and FIG. 20B is a cross-sectional view taken along the line A—A' of FIG. 20A; and FIG. 21A is a plan view of still another embodiment of this invention and FIG. 21B is a cross-sectional view taken along the line A—A' of FIG. 21A.

DETAILED DESCRIPTION OF THE PREFERRED EMBODIMENTS

A preferred embodiment of the present invention is described below with reference to the accompanied FIGS. 4A through 9B.

This process begins with the formation of gate lines 4, repair line L1, a lower line of auxiliary repair line 4a and shorting bar 18 simultaneously as shown in FIGS. 4A and 4B.

Subsequently, a selective anodization process 6 is carried out, forming aperture 5 as shown in FIGS. 5A and 5B. To be noted is that the center of aperture 5 can be anodized.

After that, insulating film 8 is coated on substrate 2 and is patterned thereafter, as shown in FIGS. 6A and 6B.

As a final process, gate pad 10 and data pad 12 are formed, at the same time an upper line of auxiliary repair line 10a is formed, thereby forming auxiliary repair line L2 completely as shown in FIGS. 7A and 7B. To be noted is that the auxiliary repair line L2 can be inserted between upper line 10a and lower line 4a of auxiliary repair line L2.

Then, the photoetching process is carried out to thoroughly isolate gate line 4 on LCD panel 2 from auxiliary repair line 12, as shown in FIGS. 8A and 8B.

Another preferred embodiment of this invention is described below with reference to FIGS. 10A through 15B.

This process begins with the formation of gate line 4, repair line L1, a lower line of auxiliary repair line 4a and shorting bar 18 on panel 2, simultaneously, with aluminum, as shown in FIGS. 10A and 10B.

Subsequently, a selectively anodization process 6 is carried out, to form partial gate line 4 as shown in FIGS. 11A and 11B.

After that, insulating film 8 is coated on panel 2 and is patterned thereafter to isolate gate line 4 from data line 16, while isolating gateline 4 from shorting bar 18, as shown in FIGS. 12A and 12B and 13A and 13B.

As a final process, gate pad 10 and data pad 12 are formed, while forming an upper auxiliary repair line 10a at the same time by patterning insulating film 8, and then auxiliary repair line L3 is formed.

Next, the photoetching process is carried out using an insulating film as a masking layer to thoroughly isolate gate line 4 on LCD panel 2 from auxiliary repair line L3 as shown in FIGS. 14A and 14B.

As described in the above-mentioned embodiments, unwanted disconnection of any data lines can be repaired by reconnecting the disconnected data lines 16, using a laser beam, to repair lines L1 vertically formed underneath the data lines 16. Subsequently, one repair line L1, which is adjacent to the connection part of the repair lines L1, and the data lines 16 are short-circuited.

Here, the position of the short circuit of the repair lines L1 is the fastest possible transmission position of the data information from the connection part of the data lines 16 and the repair lines L1.

As mentioned above, by using the upper line of the auxiliary repair line L3, it is possible to repair the data line 16 and the repair line L1.

Thus the disconnected data line can be repaired through the repair lines L1 and the auxiliary repair lines L3 with ease.

Still another preferred embodiment of this invention is described below with reference to FIGS. 16 through 21B.

This process begins with the formation of gate line 1 composed of aluminum and repair line 3 taking the shape of a square of which one side is open, and then gate line 1 and repair line 3 are connected with each other through shorting bar 2, serving as an anodization common electrode, as shown in FIGS. 16A and 16B.

Subsequently, anodization of the aluminum is carried out, hiding connecting part 4 in a photoresist as shown in FIGS. 17A and 17B.

The deposition process is performed, successively in the order of the gate insulating film 21, the amorphous silicon film 26 and the N-type amorphous silicon film 26a, and then a patterning process of the amorphous silicon layer is carried out as shown in FIGS. 18A and 18B.

Then, as shown in FIGS. 19A and 19B, gate insulating film 21 of the connection part 4 is open.

Next, as shown in FIGS. 20A and 20B, metal having a larger nonresistance than that of the gate line 1 is deposited, while gate pad 23 data pad 25 and data line 24 are patterned, simultaneously.

In conclusion, this invention is summarized that in a simple process is available and the repair process can be carried out with ease without a resistance RC delay time and lowering of the image quality.

What is claimed:

1. A liquid crystal display panel comprising:
   a substrate;
   a gate line formed on the substrate horizontally;
   a repair line formed on the substrate taking the shape of a square of which one side is open;
   a data line connected to the data driver and formed on the substrate vertically; and
   an auxiliary repair line formed on the substrate, parallel to the data line and vertically crossed with the gate line, still electrically disconnected to the gate line while electrically connected to the repair line.

2. A liquid crystal display panel of claim 1, in which the gate line is made of the same conductive material as the repair line.

3. A liquid crystal display panel of claim 1, in which the gate line and the repair line are made of aluminum.

4. A method for fabricating a liquid crystal display panel, comprising the steps of:
   a first step of forming a gate line, a repair line, a lower line of an auxiliary repair line and a shorting bar at the same time;
   a second step of anodizing a partial gate line selectively;
   a third step of coating an insulating film throughout the substrate and patterning thereof;
   a fourth step of forming a gate pad and a data pad while simultaneously forming an upper line of an auxiliary repair line, followed by coating a conductive material on the insulating film and patterning thereof; and
   a fifth step of photoetching a partial gate line adjacent to the auxiliary repair line using the upper line of the auxiliary repair line as a making layer to isolate the gate line from a auxiliary line thoroughly.

5. A liquid crystal display panel comprising:
   a substrate;
   a gate driver to generate a driving signal;
   a data driver to generate data signal;
   a gate line connected to the gate driver and formed on the substrate horizontally;
   a repair line formed on the substrate taking the shape of a square of which one side is open;
   a data line connected to the data driver and formed on the substrate vertically;
   an auxiliary repair line formed on the substrate, parallel to the data line and vertically crossed with the gate line, electrically disconnected to the gate line while electrically connected to the repair line.

6. A liquid crystal display panel of claim 5, in which the gate line is made of the same conductive material as the repair line.

7. A liquid crystal display panel of claim 5, in which the gate line and the repair line are made of aluminum.

8. A method for fabricating a liquid crystal display panel, comprising:
   a first step of forming a gate line, a repair line, a lower line of an auxiliary repair line and a shorting bar at the same time;
   a second step of anodizing a partial gate line selectively;
   a third step of forming an upper line of an auxiliary repair line by coating an insulating film over the substrate thoroughly and patterning thereof;
   a fourth step of forming a gate pad and a data pad by coating a conductive material over the substrate and patterning thereof; and
   a fifth step of photoetching a partial gate line adjacent to a auxiliary repair line using the insulating film as a masking layer to isolate the gate line from the lower line of the auxiliary line thoroughly.

9. A liquid crystal display panel comprising:
   a gate line composed of a metal and being partially coated with an anodizing film;
   a repair line taking the shape of a square of which one side is open;
   a shorting bar serving as an anodization common electrode to connect the gate line and the repair line;
   a connection part connected to the gate line;
   a gate insulating film;
   a gate pad;
   a data line; and
   a data pad.

10. A method for fabricating a liquid crystal display panel, comprising the steps of:
    a first step of forming a gate line and a repair line at the same time, and then connecting the gate line and the repair line through a shorting bar serving as an anodization common electrode;
    a second step of carrying out anodization thoroughly, hiding the connecting part with a breaking film;
    a third step of depositing a gate insulating film, an amorphous silicon gate and an N-type amorphous silicon film, successively, and then patterning the amorphous silicon; and
    a fourth step of depositing a data line having a larger nonresistance than that of the gate line, while patterning a gate pad and a data line, simultaneously.

* * * * *